United States Patent
Muszynski

[11] Patent Number: 5,994,812
[45] Date of Patent: *Nov. 30, 1999

[54] D.C. MOTOR PHASE WINDINGS AND THEIR COMMUTATION

[75] Inventor: Jerzy Muszynski, London, Canada

[73] Assignee: Siemens Canada Limited, Mississauga, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/741,160

[22] Filed: Oct. 29, 1996

[51] Int. Cl.$^6$ ..................................................... H02K 3/00
[52] U.S. Cl. ........................... 310/180; 310/179; 310/184; 310/198; 318/696
[58] Field of Search .................................... 310/180, 184, 310/179, 176, 187, 198, 201, 49 R, 195; 318/696, 431, 701, 469

[56] References Cited

U.S. PATENT DOCUMENTS

| | | | |
|---|---|---|---|
| 3,600,619 | 8/1971 | Tiarks | 310/180 |
| 3,746,959 | 7/1973 | Kobayashi et al. | 318/696 |
| 4,368,414 | 1/1983 | Watanabe et al. | 318/696 |
| 4,755,732 | 7/1988 | Ando | 318/696 |
| 4,918,347 | 4/1990 | Takaba | 310/179 |
| 5,155,427 | 10/1992 | Hori | 318/696 |
| 5,268,609 | 12/1993 | Sakashita et al. | 310/179 |
| 5,294,321 | 3/1994 | McCleer et al. | 318/131 |
| 5,382,853 | 1/1995 | Von Der Heide | 310/67 R |
| 5,448,117 | 9/1995 | Elliot | 310/49 R |
| 5,723,931 | 3/1998 | Andrey | 310/179 |

OTHER PUBLICATIONS

McGraw Hill Encyclopedia of Engineering ($2^{nd}$ Edition) p. 368, 1993.

*Primary Examiner*—Nestor Ramirez
*Assistant Examiner*—Karl Eizu Tamai

[57] ABSTRACT

Five phase windings (P1–P5) of a motor 30 are disposed on a common stator 32. An rotor 34 contains three magnetic pole pairs (M1N, M1S, M2N, M2S, M3N, M3S). Each phase winding is energized for 72° (electrical) corresponding to 24° rotor rotation (mechanical). During the first half (36 electrical degrees) of each phase winding's electrical energization, the immediately preceding phase winding is simultaneously energized, and during the second half (36 electrical degrees) of each phase winding's electrical energization, the immediately succeeding phase winding is energized. At any given time, only two of the phase windings, and no others, are being simultaneously energized.

11 Claims, 3 Drawing Sheets

D.C. MOTOR PHASE WINDINGS AND THEIR COMMUTATION

FIELD OF THE INVENTION

This invention relates generally to rotary D.C. machines, especially to a novel winding configuration that can be used to advantage in a permanent magnet brushless D.C. motor.

BACKGROUND AND SUMMARY OF THE INVENTION

A brush type D.C. motor comprises a stator having arcuately shaped permanent magnets distributed around the stator's circumference to create alternating magnetic poles. These magnets provide magnetic flux patterns that interact with commutated electric current flow delivered via brushes to windings disposed on the motor's armature to produce armature shaft rotation.

A brushless type D.C. motor may be considered to comprise a stationary part, the stator, and a rotary part, the rotor. Windings are typically on the stator, and magnets on the rotor. There are several different configurations for a brushless, electronically commutated D.C. motor. In one, the rotor is disposed in circumferentially surrounding relation to the stator, with an intervening radial air gap between the two; in another, the stator is disposed in circumferentially surrounding relation to the rotor, with an intervening radial air gap between the two; and in yet another, the stator and rotor are axially confronting, separated by an axial air gap. In these configurations, the current flow to the windings is electronically commutated, rather than being commutated by mechanical commutators and brushes.

A known form of stator comprises winding slots that are spaced circumferentially around its perimeter. The slots are open in the radial direction and they are parallel to the rotor axis of rotation, being also open at their axial ends. In a motor configuration where the stator surrounds the rotor, the slots are open radially inwardly while in a motor configuration where the rotor surrounds the stator, the slots are open radially outwardly. Windings are disposed in these slots in predetermined winding patterns that will produce shaft rotation when they are energized in proper sequence by electronic commutation.

The present invention relates to a novel winding configuration that is especially, although not necessarily exclusively, useful in a permanent magnet brushless D.C. motor. In the disclosed exemplary embodiment, the invention comprises a five phase stator winding containing five individually commutated windings. Permanent magnets of the rotor provide three magnetic poles pairs wherein each pole pair spans essentially 120° (mechanical) of the rotor circumference.

Generally speaking, the invention relates to a D.C. motor comprising an rotor and a stator circumferentially separated from each other by an air gap, one of the stator and the rotor providing magnetic flux paths across the air gap for interaction with the other of the stator and the rotor, the other of the stator and the rotor comprising multiple phase windings, means for selectively connecting the phase windings in sequence to a D.C. electrical source, wherein each phase winding is energized for a certain span of rotor rotation, and during an initial portion of that span, the immediately preceding phase winding is simultaneously energized, and during a final portion of that span the immediately succeeding phase winding is energized. The invention is further characterized in that at any given time, only two of the phase windings, and no others, are being simultaneously energized.

Principles, and various features and advantages, of the invention will be presented in the following detailed description that is accompanied by drawings representing the best mode contemplated at this time for carrying out the invention.

DESCRIPTION OF THE PREFERRED EMBODIMENT

Figure 1A:
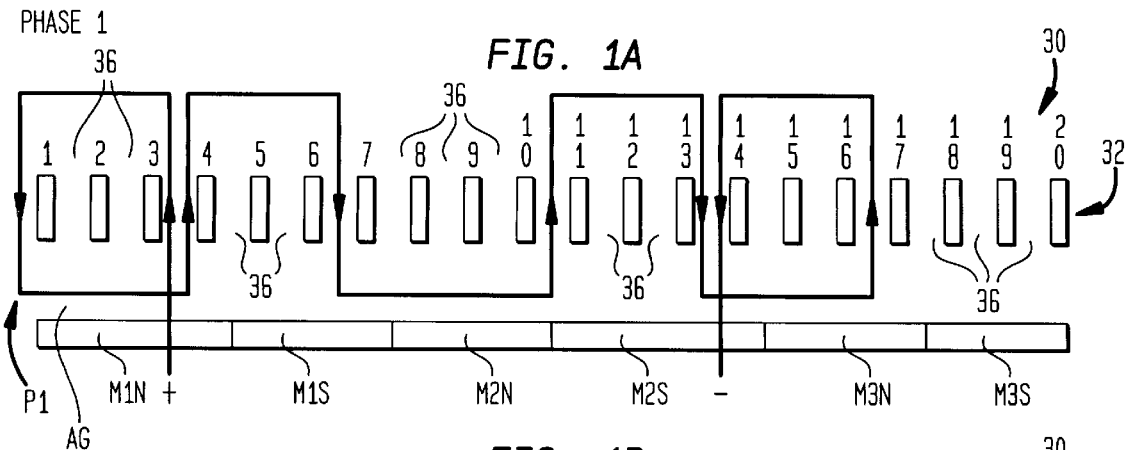
FIGS. 1A–1E are schematic developed views of each of the five phases of the exemplary embodiment.
Figure 1B:
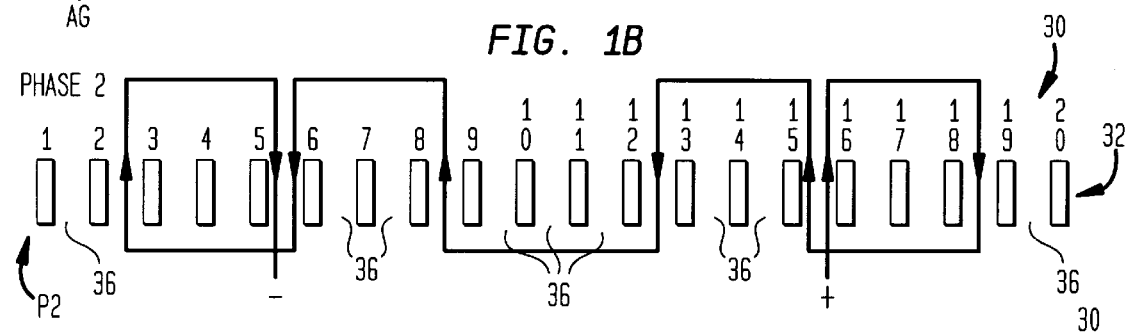
Figure 1C:
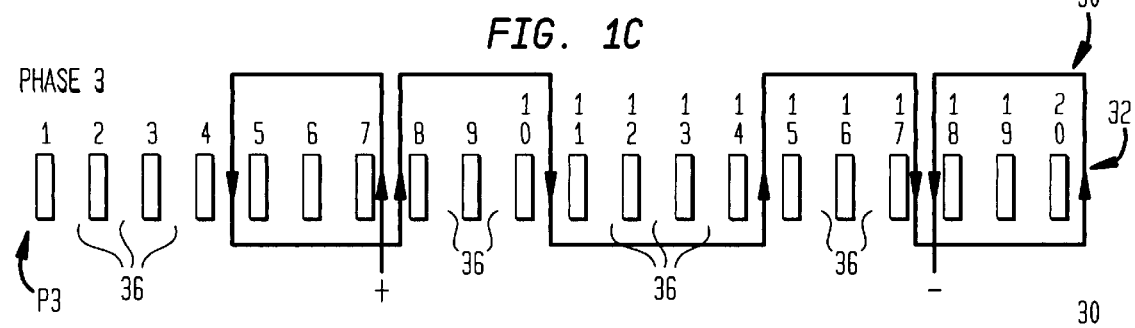
Figure 1D:
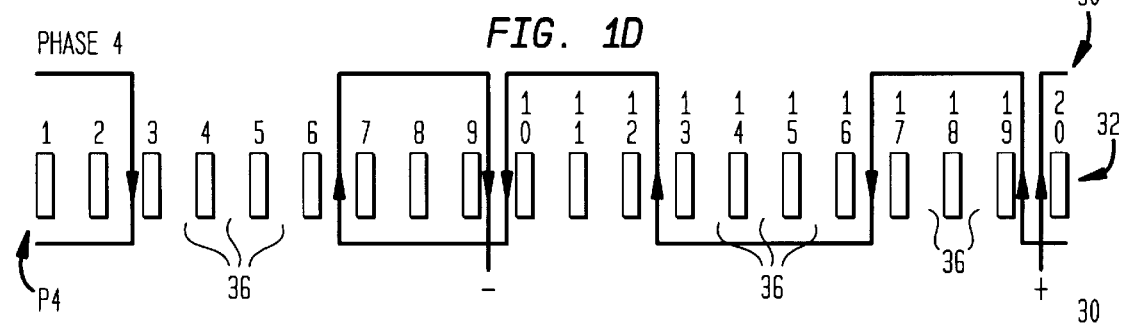
Figure 1E:
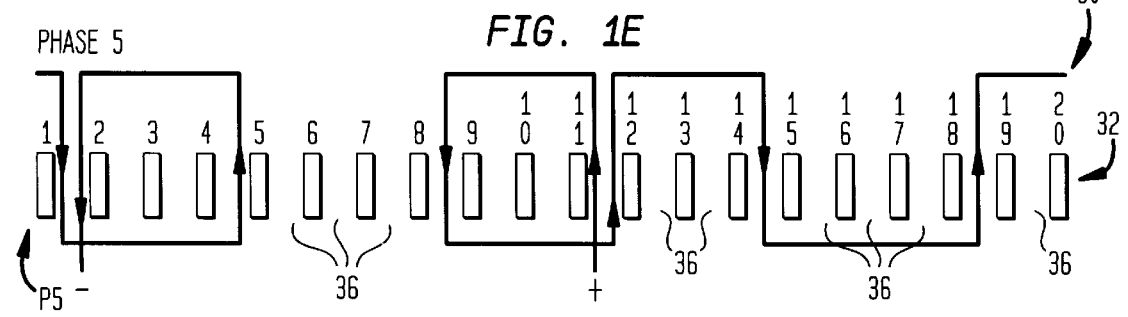

FIGS. 1A–1E illustrate respective developed views of each of five winding phases P1–P5 of a motor 30 that are disposed on a common motor stator 32. Each FIG. 1A–1E also shows an rotor 34 containing three magnetic pole pairs, M1N, M1S, M2N, M2S, M3N, M3S, in developed views, in relation to stator 32. Conventional mechanical details of motor 30 are not portrayed because they are unnecessary for an understanding of the inventive principles.

One possible configuration for an actual motor having a radial air gap would include a housing containing the stator mounted therein in surrounding relation to the rotor. The ends of an rotor shaft that extend from opposite ends of the rotor are journaled by conventional journal means to provide for rotor rotation when the motor is operated. Another possible configuration for an actual motor having a radial air gap would include a stator surrounded by the rotor wherein the rotor is journaled on a stationary frame to provide for rotor and rotor shaft rotation when the motor is operated.

The individual poles M1N, M1S, M2N, M2S, M3N, M3S, are centered at 60° intervals around the circumference of the stator, with each pole pair spanning essentially 120 mechanical degrees, and they are separated radially from the stator by an air gap AG. The magnetic poles are in a pattern of alternating polarity to provide magnetic flux paths that interact with windings P1–P5 to produce rotor rotation.

Stator 32 has a cylindrical shape and contains a number of winding slots 36 spaced around its circumference. The drawing shows twenty such slots 36 centered at 18° intervals (mechanical). The slot lengths run parallel to the rotor shaft axis, and immediately consecutive slots 36 are separated by walls that are numbered 1 through 20. Each slot 36 is open at the radial end that faces the rotor.

Each phase winding P1–P5 comprises a length of motor wire that is wound on stator 32 in the particular winding pattern illustrated to portray the inventive principles. The ends of each wire are adapted to be connected to an electronic commutator (not shown) that sequentially energizes the windings from a D.C. electrical source in accordance with the inventive principles to create motor torque that acts to rotate the rotor and its shaft. This will be more fully explained later with respect to FIG. 3.

Each phase winding P1–P5 is shown to have ends that are marked in the Figs. as + (positive) and − (minus). This denotes that when each phase winding is energized, direct current flows through the wire from positive to negative. In FIGS. 1A–1E, the direction of current flow in each phase winding is marked by small arrows. Because of the manner of winding the individual phases, direct current will pass through a slot in either one axial direction or the opposite axial direction. For convenience in the ensuing description, one of these direction will be referred to as the first direction and the opposite as the second direction.

In phase winding P1, current will flow in the first direction in the slot 36 between walls 3 and 4, in the slot 36 between walls 10 and 11, and in the slot 36 between walls 16 and 17. Current will flow in the second direction in the slot 36 between walls 20 and 1, in the slot 36 between walls 6 and 7, and in the slot 36 between walls 13 and 14.

In phase winding P2, current will flow in the first direction in the slot 36 between walls 2 and 3, in the slot 36 between walls 8 and 9, and in the slot 36 between walls 15 and 16. Current will flow in the second direction in the slot 36 between walls 5 and 6, in the slot 36 between walls 12 and 13, and in the slot 36 between walls 18 and 19.

In phase winding P3, current will flow in the first direction in the slot 36 between walls 7 and 8, in the slot 36 between walls 14 and 15, and in the slot 36 between walls 20 and 1. Current will flow in the second direction in the slot 36 between walls 4 and 5, in the slot 36 between walls 10 and 11, and in the slot 36 between walls 17 and 18.

In phase winding P4, current will flow in the first direction in the slot 36 between walls 6 and 7, in the slot 36 between walls 12 and 13, and in the slot 36 between walls 19 and 20. Current will flow in the second direction in the slot 36 between walls 2 and 3, in the slot 36 between walls 9 and 10, and in the slot 36 between walls 16 and 17.

In phase winding P5, current will flow in the first direction in the slot 36 between walls 4 and 5, in the slot 36 between walls 11 and 12, and in the slot 36 between walls 18 and 19. Current will flow in the second direction in the slot 36 between walls 1 and 2, in the slot 36 between walls 8 and 9, and in the slot 36 between walls 14 and 15.

It can be seen that each slot will be occupied by the same number of wire segments, namely two in this illustration, but it should be understood that they may also be filled with multiples of two so that each slot still contains the same number of wire segments passing through it.

Figure 2A:
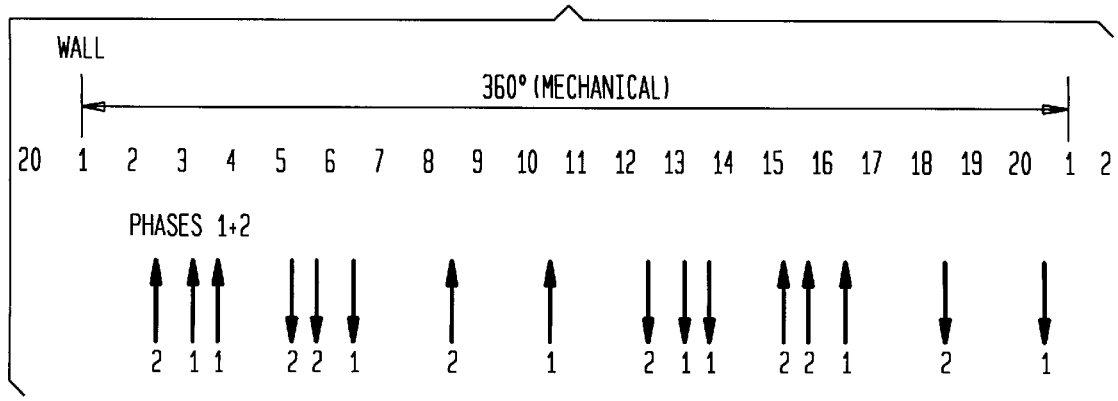
FIGS. 2A–2E are diagrammatic representations of a sequence of energizing the phases to produce motor rotation.
Figure 2B:
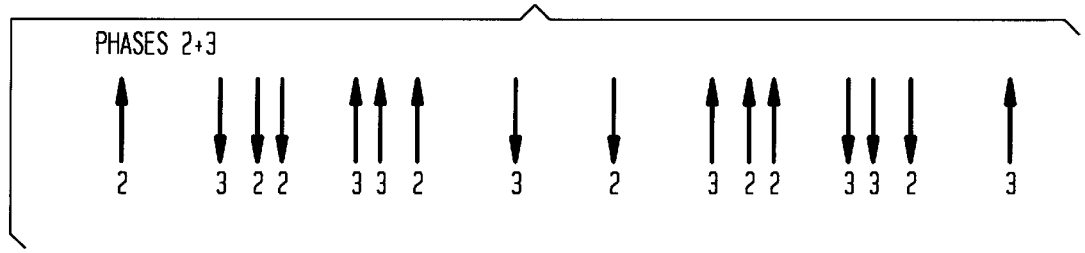
Figure 2C:
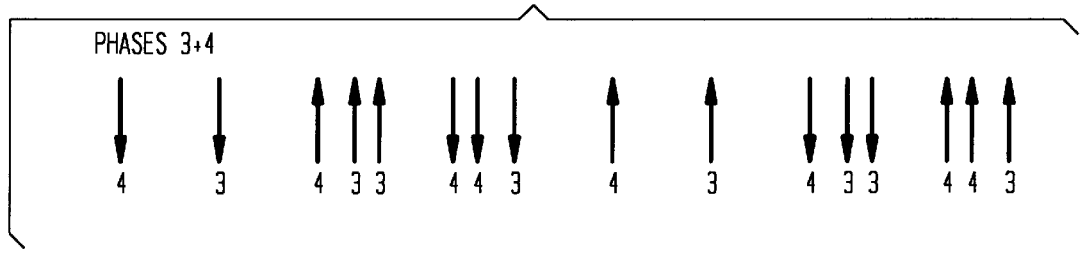
Figure 2D:
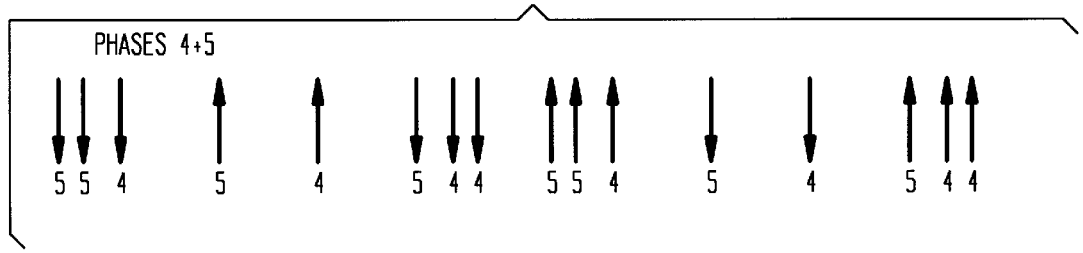
Figure 2E:
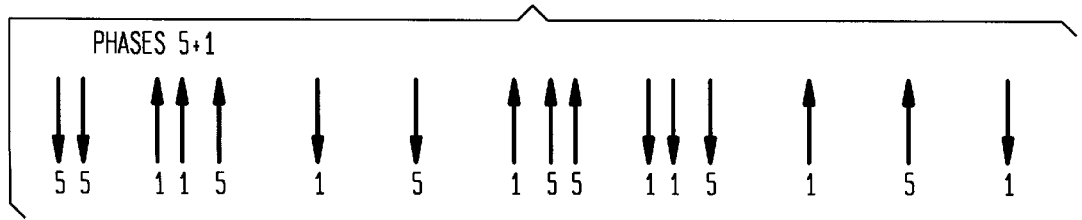

FIGS. 2A–2E show successive conditions of energizing the phase windings in accordance with the inventive principles. FIG. 2A shows phases P1 and P2 concurrently energized; FIG. 2B shows phases P2 and P3 concurrently energized; FIG. 2C shows phases P3 and P4 concurrently energized; FIG. 2D shows phases P4 and P5 concurrently energized; and FIG. 2E shows phases P5 and P1 concurrently energized. Each condition occurs in succession. Each phase winding is energized for 72° (electrical) corresponding to 24° rotor rotation (mechanical) because of the three pole pairs of the rotor. During the first half (36 electrical degrees) of each phase winding's electrical energization, the immediately preceding phase winding is simultaneously energized, and during the second half (36 electrical degrees) of each phase winding's electrical energization, the immediately succeeding phase winding is energized. Hence, one phase winding is switched on and another is switched off every 36 electrical degrees so that two of the phase windings are being simultaneously energized at any given time while the other three are not. Each phase winding is energized for a span of rotor rotation equal to 360° (mechanical) divided by the product of the number of phase windings and the number of pole pairs.

The changes in energizing the windings that occur at every 36° (electrical) acts on the stator flux patterns to produce continuing torque on the rotor, thereby resulting in continuous rotor rotation. Although the directions of current flow in certain slots in any one of the five patterns shown may oppose the desired direction of motor rotation, the collective effect of the combined current flows in all slots produces reasonably efficient motor operation.

Figure 3:
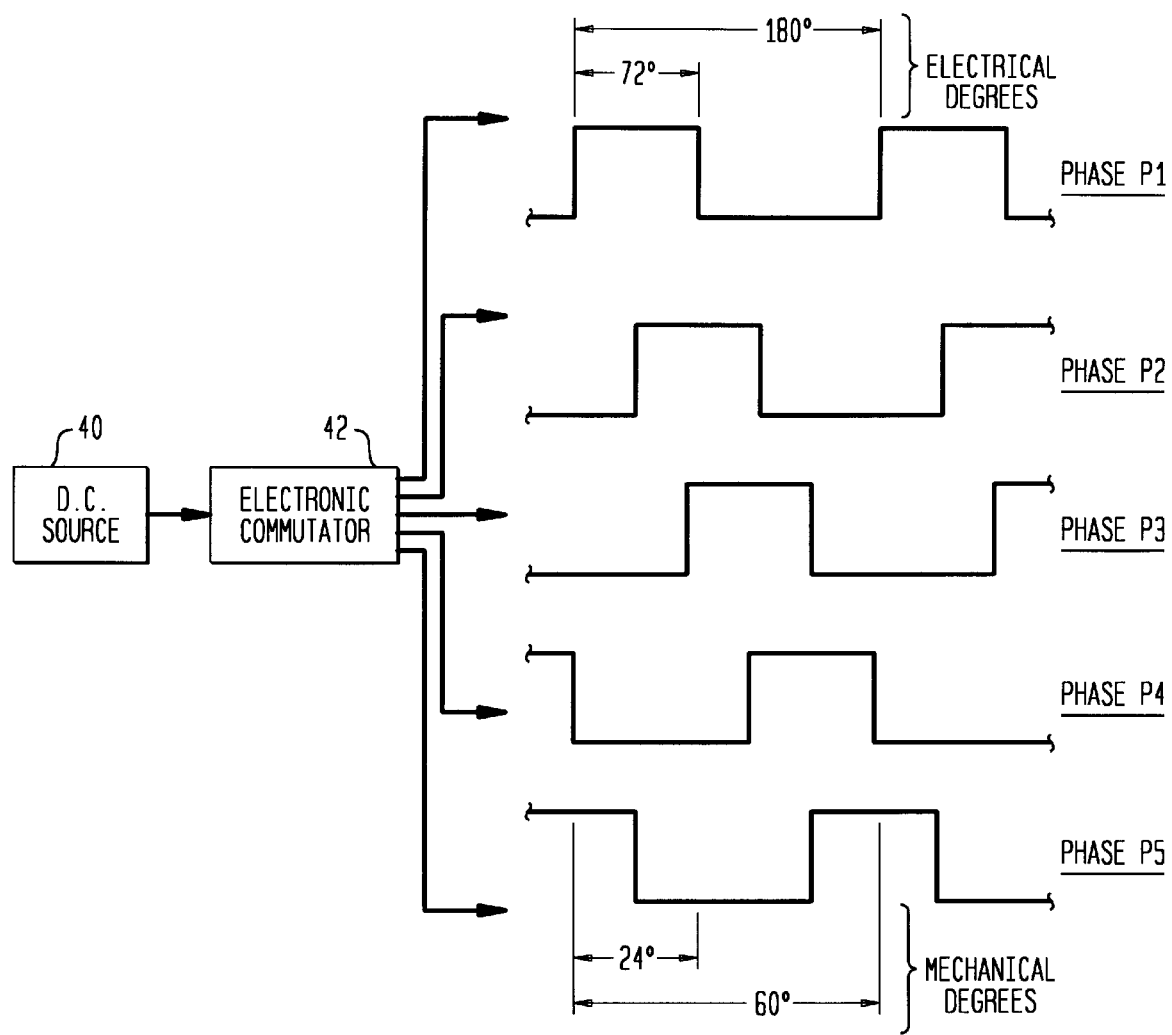
FIG. 3 is a schematic block diagram of circuitry for generating phase-energizing waveforms to produce motor rotation.

The electronic commutation of the windings is produced by electronic circuitry that is constructed in accordance with known electronic commutation design principles to provide the energization pattern described herein with reference to FIG. 3.

FIG. 3 shows a D.C. source 40 and an electronic commutator 42 for generating the waveforms P1, P2, P3, P4, and P5 in the manner previously described. FIG. 3 shows each waveform as a function of both electrical degrees and mechanical degrees, and it also shows the relative relationship of the waveforms, as previously described.

Thus motor 30 has been shown to comprise a stator containing a plurality of slots distributed circumferentially equiangularly about and parallel to the motor axis and plural phase windings disposed on the stator with segments of each phase winding being disposed in certain stator slots so that they are parallel to the motor axis. The number of phase windings is an odd integer greater than one, and each phase winding comprises a winding pattern identical to, but circumferentially equiangularly spaced from, those of the others, in mutually overlapping relation both with an immediately circumferentially preceding phase winding and with an immediately circumferentially succeeding phase winding. A first phase winding comprises a first segment disposed in a first slot, second and third segments disposed in a fourth slot that is spaced from the first slot by second and third slots, a fourth segment disposed in a seventh slot that is spaced from the fourth slot by fifth and sixth slots, a fifth segment disposed in an eleventh slot that is spaced from the seventh slot by eighth, ninth, and tenth slots, sixth and seventh segments disposed in a fourteenth slot that is spaced from the eleventh slot by twelfth and thirteenth slots, and an eighth segment disposed in a seventeenth slot that is spaced from the fourteenth slot by fifteenth and sixteenth slots. A second phase winding comprises a first segment disposed in the third slot, second and third segments disposed in the sixth slot, a fourth segment disposed in the ninth slot, a fifth segment disposed in the thirteenth slot, sixth and seventh segments disposed in the sixteenth slot, and an eighth segment disposed in a nineteenth slot that is spaced from the seventeenth slot by an eighteenth slot. A third phase winding comprises a first segment disposed in the fifth slot, second and third segments disposed in the eighth slot, a fourth segment disposed in the eleventh slot, a fifth segment disposed in the fifteenth slot, sixth and seventh segments disposed in the eighteenth slot, and an eighth segment disposed in the first slot. A fourth phase winding comprises a first segment disposed in the seventh slot, second and third segments disposed in the tenth slot, a fourth segment disposed in the thirteenth slot, a fifth segment disposed in the seventeenth slot, sixth and seventh segments disposed in a twentieth slot that is between the nineteenth and the first slots, and an eighth segment disposed in the third slot. A fifth phase winding comprises a first segment disposed in the ninth slot, second and third segments disposed in the twelfth slot, a fourth segment disposed in the fifteenth slot, a fifth segment disposed in the nineteenth slot, sixth and seventh segments disposed in the second slot, and an eighth segment disposed in the fifth slot. The aggregate number of segments in each slot is equal to that in every other slot. The segments of each phase winding are disposed such that current flow through a phase winding flows through its first, fourth, sixth, and seventh segments in one axial direction while current flow through the second, third, fifth, and eighth segments is in an opposite axial direction. When a winding is energized by current flow in the manner disclosed, the direction of current flow in its first, fourth, sixth, and seventh segments is opposite that in the first, fourth, sixth, and seventh segments of the immediately preceding phase winding when the latter is energized, and the direction of current flow in its second, third, fifth, and eighth segments is opposite that in the second, third, fifth, and eighth segments of the immediately succeeding phase winding when the latter is energized.

While a presently preferred embodiment of the invention has been illustrated and described, it should be appreciated that principles are applicable to other equivalent embodiments falling within the scope of the following claims.

What is claimed is:

1. A D.C. motor comprising a rotor and a stator separated from each other by an air gap, one of the stator and the rotor providing magnetic flux paths across the air gap for interaction with the other of the stator and the rotor, the other of the stator and the rotor comprising multiple phase windings, and a commutator operable at defined mechanical angular positions about an axis of the motor for selectively connecting the phase windings in sequence to a D.C. electrical source to produce continuous rotor rotation by causing each phase winding to be energized for a certain angular span of rotor rotation starting at a commutation that occurs at a beginning angular location about the motor axis referenced to the stator and ending at a commutation that occurs at an ending angular location referenced to the stator, by causing an immediately preceding winding to be energized during an initial portion of that angular span, and by causing an immediately succeeding winding to be energized during a final portion of that angular span, wherein the one of the stator and the rotor providing magnetic flux paths across the air gap for interaction with the other of the stator and the rotor is the rotor, and the other of the stator and the rotor is the stator, and wherein the rotor comprises a certain whole number of magnetic pole pairs greater than or equal to one, each phase winding is energized for a span of rotor rotation equal to 360° (mechanical) divided by the product of the number of phase windings and the number of pole pairs, during an initial half of that span, the immediately preceding phase winding is simultaneously energized, and during a final half of that span, the immediately succeeding phase winding is simultaneously energized, and wherein at any given time, only two of the phase windings are simultaneously energized.

2. A D.C. motor comprising a rotor and a stator separated from each other by an air gap, one of the stator and the rotor providing magnetic flux paths across the air gap interaction with the other of the stator and the rotor, the other of the stator and the rotor comprising multiple phase windings, and a commutator operable at defined mechanical angular positions about an axis of the motor for selectively connecting the phase windings in sequence to a D.C. electrical source to produce continuous rotor rotation by causing each phase winding to be energized for a certain annular span of rotor rotation starting at a commutation that occurs at a beginning angular location about the motor axis referenced to the stator and endings at a commutation that occurs at an ending angular location referenced to the stator, by causing an immediately preceding winding to be energized during an initial portion of that angular span, and by causing an immediately succeeding winding to be energized during a final portion of that angular span, wherein the one of the stator and the rotor providing magnetic flux paths across the air gap for interaction with the other of the stator and the rotor comprises a certain whole number of magnetic pole pairs greater than or equal to one, each phase winding is energized for a span of rotor rotation equal to 360° (mechanical) divided by the product of the number of phase windings and the number of pole pairs, and during an initial half of that span, the immediately preceding phase winding is simultaneously energized, and during a final half of that span, the immediately succeeding phase winding is simultaneous, and wherein at any given time, only two of the phase windings are being simultaneously energized.

3. A D.C. motor as set forth in claim 2 in which there are five phase windings.

4. A D.C. motor as set forth in claim 3 in which the five phase windings are on the stator.

5. A D.C. motor as set forth in claim 4 in which there are three magnetic pole pairs on the rotor, each pole pair spanning essentially 120° (mechanical) around the circumference of the rotor, and the poles alternate in polarity.

6. A D.C. motor comprising a rotor having an axis of rotation and a stator, the rotor and stator being separated from each other by an air gap, one of the stator and the rotor comprising magnetic poles for providing magnetic flux paths across the air gap for interaction with the other of the stator and the rotor, the other of the stator and the rotor comprising a body containing a plurality of slots distributed circumferentially equiangularly about and parallel to the motor axis, and plural phase windings dispose on the body with segments of each phase winding disposed in certain slots, the number of phase windings being an odd integer greater than one, and each phase winding being disposed on the body in a winding pattern identical to, but circumferentially equiangularly spaced from, those of the others, in mutually overlapping relation both with an immediately circumferentially preceding phase winding and with an immediately circumferentially succeeding phase winding, in which there are twenty such slots at 18° angular intervals about the axis and five such phase windings, and in which a first phase winding comprises a first segment disposed in a first slot, second and third segments disposed in a fourth slot that is spaced from the first slot by second and third slots, a fourth segment disposed in a seventh slot that is spaced from the fourth slot by fifth and sixth slots, a fifth segment disposed in an eleventh slot that is spaced from the seventh slot by eighth, ninth, and tenth slots, sixth and seventh segments disposed in a fourteenth slot that is spaced from the eleventh slot by twelfth and thirteenth slots, and an eighth segment disposed in a seventeenth slot that is spaced from the fourteenth slot by fifteenth and sixteenth slots, a second phase winding comprises a first segment disposed in the third slot, second and third segments disposed in the sixth slot, a fourth segment disposed in the ninth slot, a fifth segment disposed in the thirteenth slot, sixth and seventh segments disposed in the sixteenth slot, and an eighth segment disposed in a nineteenth slot that is spaced from the seventeenth slot by an eighteenth slot, a third phase winding comprises a first segment disposed in the fifth slot, second and third segments disposed in the eighth slot, a fourth segment disposed in the eleventh slot, a fifth segment disposed in the fifteenth slot, sixth and seventh segments disposed in the eighteenth slot, and an eighth segment disposed in the first slot, a fourth phase winding comprises a first segment disposed in the seventh slot, second and third segments disposed in the tenth slot, a fourth segment disposed in the thirteenth slot, a fifth segment disposed in the seventeenth slot, sixth and seventh segments disposed in a twentieth slot that is between the nineteenth and the first slots, and an eighth segment disposed in the third slot, and a fifth phase winding comprises a first segment disposed in the ninth slot, second and third segments disposed in the twelfth slot, a fourth segment disposed in the fifteenth slot, a fifth segment disposed in the nineteenth slot, sixth and seventh segments disposed in the second slot, and an eighth segment disposed in the fifth slot.

7. A D.C. motor as set forth in claim 6 in which the aggregate number of segments in each slot is equal to that in every other slot.

8. A D.C. motor as set forth in claim 6 in which segments of each phase winding are disposed such that current flow in any phase winding flows through the first, fourth, sixth, and seventh segments in one axial direction while current flows through the second, third, fifth, and eighth segments in an opposite axial direction.

9. A D.C. motor as set forth in claim 8 including a commutator operable to commutate current flow to the phase windings every 24° of rotor rotation about the axis to produce continuous rotor rotation, and when any particular phase winding is energized, to cause current in the first, fourth, sixth, and seventh segments of that phase winding to flow in an axial direction opposite that of current flow in the first, fourth, sixth, and seventh segments of an immediately preceding phase winding when the latter is concurrently energized, and to cause current in the second, third, fifth, and eighth segments of that particular phase winding to flow in an axial direction opposite that of the current flow in the second, third, fifth, and eighth segments of an immediately succeeding phase winding when the latter is energized.

10. A D.C. motor as set forth in claim 9 in which the magnetic poles for providing magnetic flux paths across the air gap comprise three pole pairs centered at 60° intervals about the axis.

11. A D.C. motor comprising a rotor and a stator separated from each other by an air gap, one of the stator and the rotor providing magnetic flux paths across the air gap for interaction with the other of the stator and the rotor, the other of the stator and the rotor comprising multiple phase windings, and a commutator operable at defined mechanical angular positions about an axis of the motor for selectively connecting the phase windings in sequence to a D.C. electrical source to produce continuous rotor rotation by causing each phase winding to be energized for a certain angular span of rotor rotation starting at a commutation that occurs at a beginning angular location about the motor axis referenced to the stator and ending at a commutation that occurs at an ending angular location referenced to the stator, by causing an immediately preceding winding to be energized during an initial portion of that angular span, and by causing an immediately succeeding winding to be energized during a final portion of that angular span, wherein the rotor comprises a certain whole number of magnetic pole pairs greater than or equal to one, each phase winding is energized for a span of rotor rotation equal to 360° (mechanical) divided by the product of the number of phase windings and the number of pole pairs, during an initial half of that span, the immediately preceding phase winding is simultaneously energized, and during a final half of that span, the immediately succeeding phase winding is simultaneously energized, and wherein at any given time, only two of the phase windings are simultaneously energized.

* * * * *